United States Patent [19]

Barrier

[11] Patent Number: 5,388,874
[45] Date of Patent: Feb. 14, 1995

[54] QUICK CONNECT/DISCONNECT LATCH SCREW COUPLING

[76] Inventor: M. M. Barrier, 15134 Trailside Dr., Houston, Tex. 77095

[21] Appl. No.: 60,243

[22] Filed: May 11, 1993

[51] Int. Cl.⁶ ............................................. F16L 37/18
[52] U.S. Cl. ..................................... 285/315; 285/325
[58] Field of Search ............... 285/325, 327, 315, 316, 285/86

[56] References Cited

U.S. PATENT DOCUMENTS

| | | | |
|---|---|---|---|
| 980,677 | 1/1911 | Rhoads . | |
| 1,093,528 | 4/1914 | Bowes, Jr. . | |
| 2,613,089 | 10/1952 | Maiman | 285/178 |
| 2,825,039 | 2/1958 | Schurman et al. | 339/92 |
| 3,039,794 | 6/1962 | DeCenzo | 285/86 X |
| 3,162,470 | 12/1964 | Davidson et al. | 285/86 |
| 3,197,730 | 7/1965 | Hargett | 339/102 |
| 3,445,865 | 5/1969 | McLoad | 339/89 |
| 3,537,730 | 11/1970 | Kresin | 285/86 |
| 3,583,667 | 6/1971 | Amneus, Jr. | 251/149.5 |
| 3,613,726 | 10/1971 | Torres | 137/614.03 |
| 3,643,207 | 2/1972 | Cairns | 339/96 |
| 3,649,052 | 3/1972 | Snyder, Jr. | 285/38 |
| 3,719,918 | 3/1973 | Kerr | 339/90 R |
| 3,808,579 | 4/1974 | Mina et al. | 285/316 X |
| 4,415,213 | 11/1983 | Punako et al. | 339/49 R |
| 4,433,725 | 2/1984 | Bowyer | 166/65 R |
| 4,465,097 | 8/1984 | Suzuki et al. | 285/86 X |
| 4,530,075 | 7/1985 | Pearson | 367/20 |
| 4,598,967 | 7/1986 | White | 339/89 R |
| 4,767,136 | 8/1988 | Lehmann | 285/32 |
| 4,993,260 | 2/1991 | Bednarz | 73/201 |
| 5,020,591 | 6/1991 | Shore | 166/55 |
| 5,026,024 | 6/1991 | Ito | 285/86 X |

FOREIGN PATENT DOCUMENTS

| | | | |
|---|---|---|---|
| 17810 | 1/1914 | United Kingdom | 285/327 |
| 2186044 | 8/1987 | United Kingdom | 285/316 |

OTHER PUBLICATIONS

Penton Publishing Co., Hydraulics & Pneumatics, Mar. 1979, pp. HP 8–11.
Aeroquip Corp., Industrial Connectors-Fluid Conveying Products, Couplings, pp. 1–40, 1991.
TEMA Brochure for TEMA patented pressure eliminator, undated.

*Primary Examiner*—Dave W. Arola
*Attorney, Agent, or Firm*—Pravel, Hewitt, Kimball & Krieger

[57] ABSTRACT

A mechanical coupling including a plug assembly and a receptacle assembly. The plug assembly has a first latching body rotatably connected to a coupling nut such that the coupling nut is capable of rotating relative to the latching body. The coupling nut includes an interior threaded portion which is threaded to an exterior threaded portion of an inner body. The coupling nut and the inner body are in constant threaded engagement in a sealed chamber. The receptacle assembly has a second latching body capable of interconnecting with the first latching body. The plug assembly includes a first coupling member and the receptacle assembly includes a second coupling member. The first and second coupling members are coupled together by further rotating the coupling nut which advances the first coupling connector towards the second coupling connector.

19 Claims, 7 Drawing Sheets

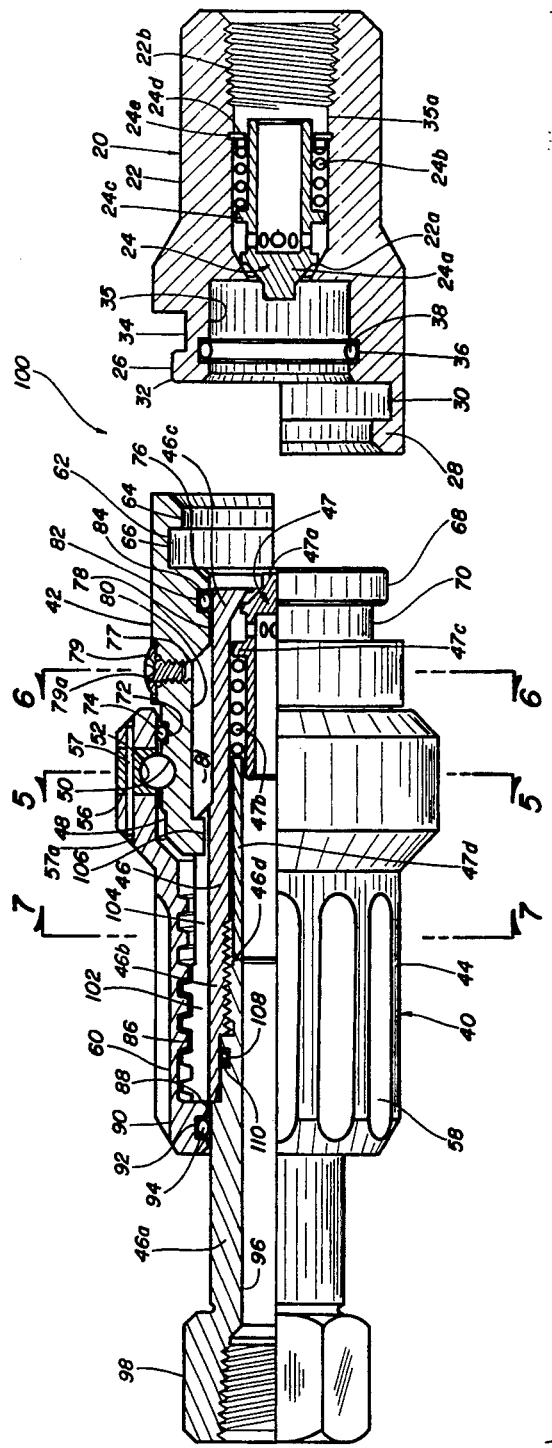
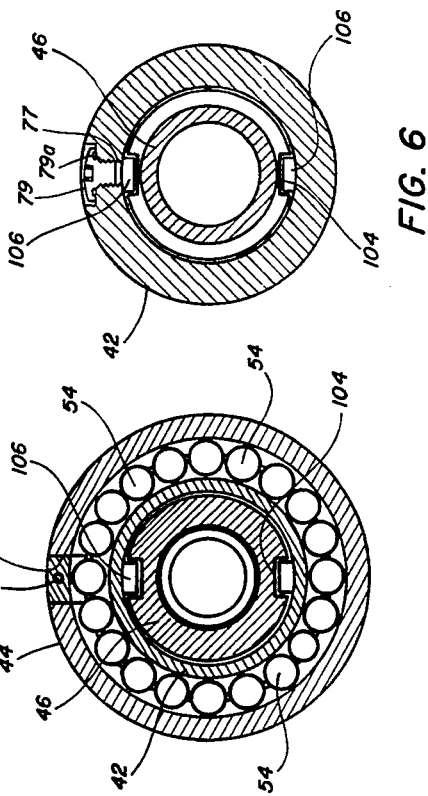
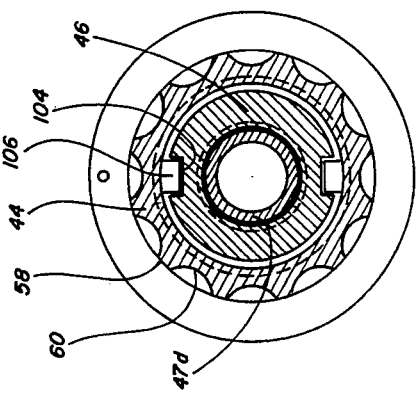
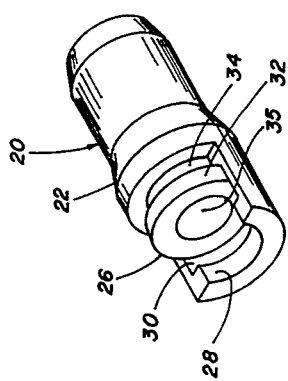
FIG. 1
FIG. 5
FIG. 6
FIG. 7
FIG. 3

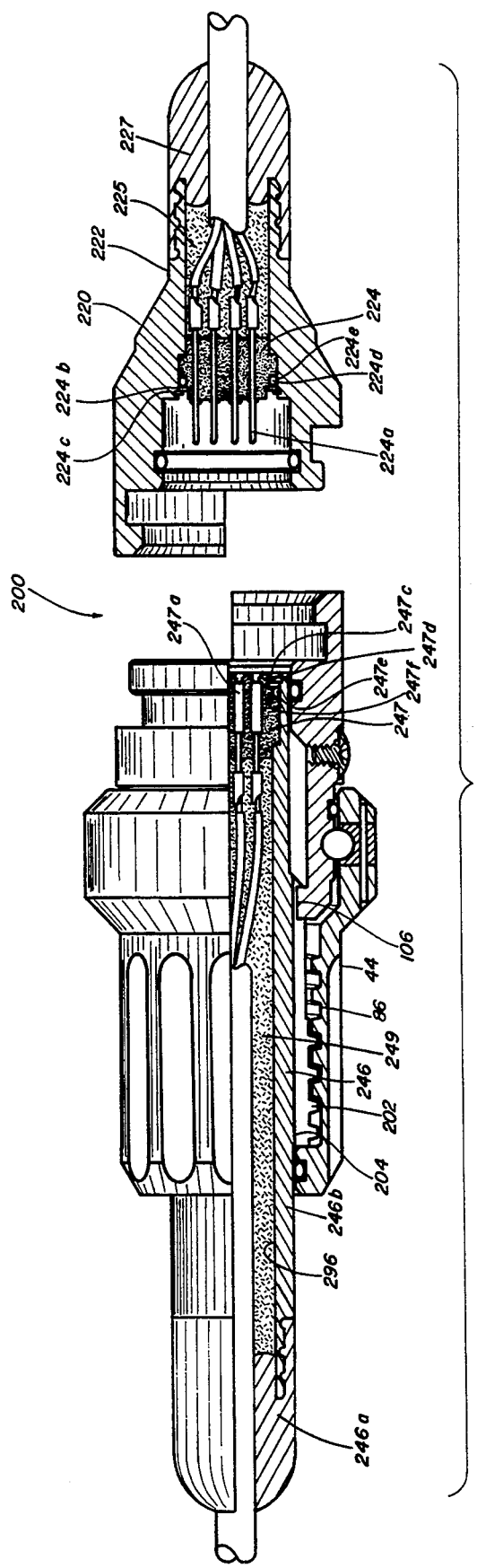
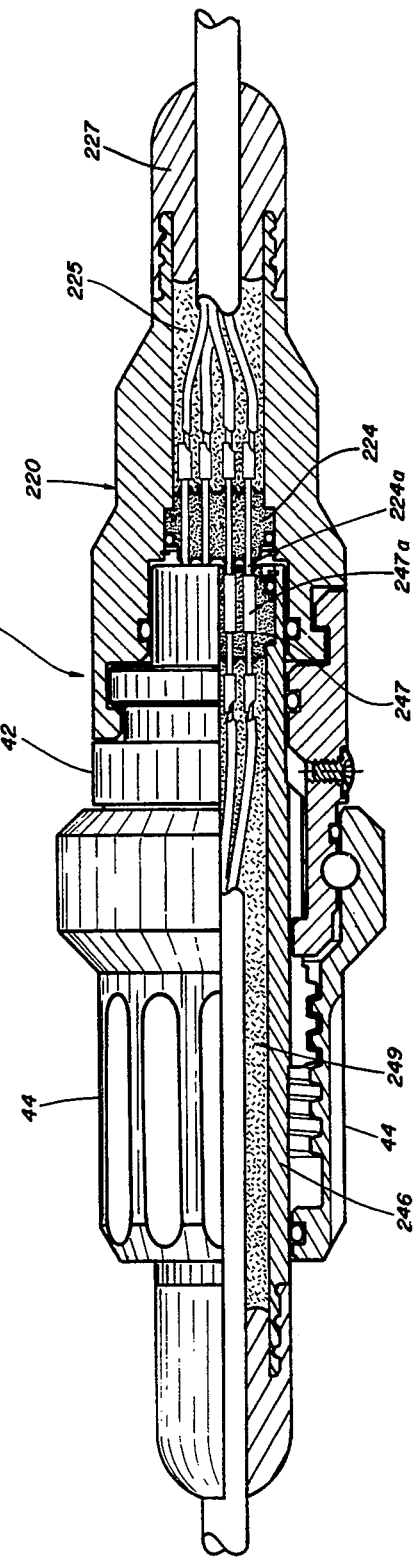
FIG. 8a
FIG. 8b

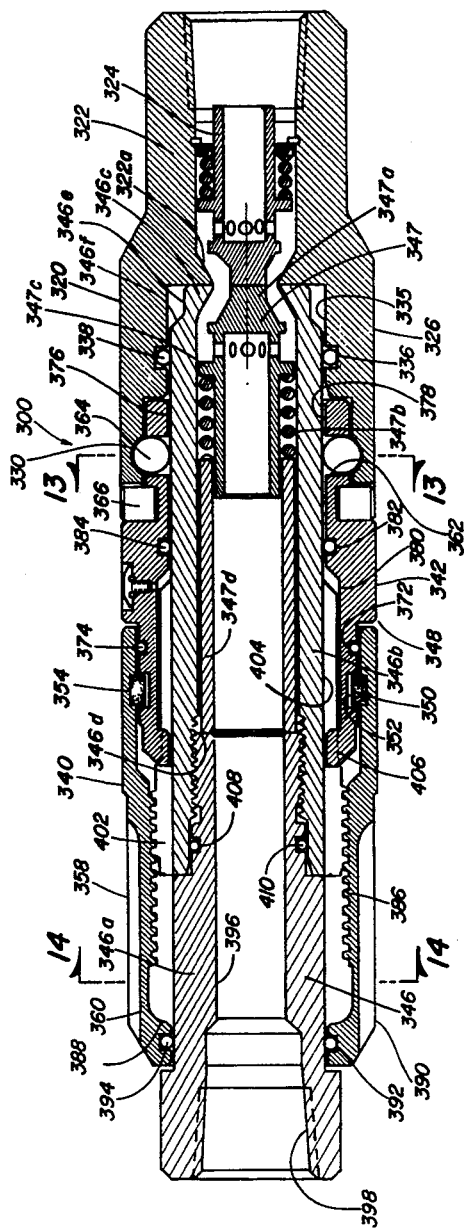
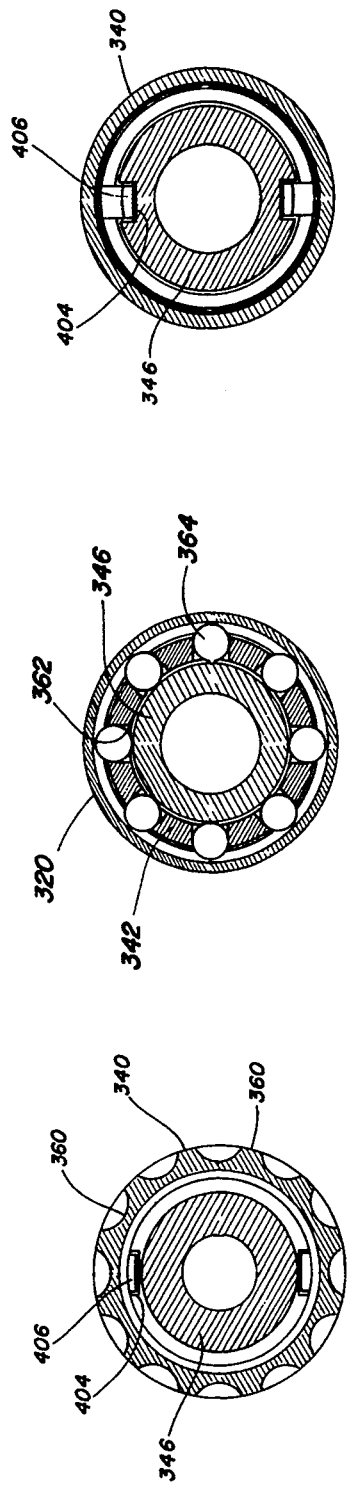

QUICK CONNECT/DISCONNECT LATCH SCREW COUPLING

BACKGROUND OF THE INVENTION

1. Field of the Invention

The present invention relates to coupling mechanisms, and more specifically to quick disconnect mechanical couplings.

2. Description of the Prior Art

Quick connect/disconnect mechanical couplings are connecting devices which permit easy, immediate connection and separation of fluid lines and electrical conductors. Typically, mechanical couplings are made up of two members commonly referred to as a male or pin connector and a female or socket connector.

Mechanical fluid couplings are typically designed to provide rapid coupling and uncoupling of high pressure lines while at the same time providing a high degree of safety during both flow and non-flow conditions. It is important that the fluid coupling assures positive locking and a fluid-tight joint in the high pressure line. The mechanical fluid couplings are generally designed to assist in overcoming the resistive forces of joining the coupling members resulting from the fluid pressure in the lines.

A common fluid coupling designed to assist in joining the coupling connectors is the threaded coupling having a threaded coupling nut which is captured by a shoulder and a retaining ring on a first coupling connector. A second coupling connector has an externally threaded portion. As the coupling nut is threaded on the externally threaded portion of the second coupling connector, the coupling nut acts against the shoulder of the first coupling connector drawing the coupling connectors together. The same principle is used with dogs or lugs to engage camming surfaces within a locking sleeve of a coupling connector. There is also the bayonet coupling whereby dogs or lugs fixed to one coupling connector react against a cam surface on the other coupling connector as one member is rotated relative to the other. One good feature of threaded couplings is that they are not likely to disconnect accidentally.

A non-threaded type coupling is a push style mechanical coupling which involves the displacement of a spring-loaded sleeve. The displacement of the spring-loaded sleeve allows locking members to move radially outward as the pin is inserted into the socket. Once the pin is fully engaged, the spring-loaded sleeve is released. As the spring-loaded sleeve returns to its normal position, an interior cam surface forces and holds the locking members in the pin's groove, thereby locking the pin within the socket. Unlocking involves the reverse process. The locking members can be balls, pins, palls, wire rings, dogs, cams, collets, breech lugs, etc.

Electrical couplings do encounter the resistive forces of fluid couplings. However, electrical couplings must be sealed and polarized to ensure the proper coupling of the electrical conductors. Conventionally, electrical couplings achieve their polarization by an external-internal key and keyway usually in the proximity of the contacts. Sealing of the contact cavity is typically achieved by O-ring seal glands located in this same region. In order to achieve proper and timely key engagement and seal engagement without one interfering with the other, the coupling usually requires additional length of engagement and stepped diameters, thus increasing the complexity of the connector and thereby increasing manufacturing costs. The internal-external relationship of key and keyway results in one internal element being hidden from view while the other external element is obscured by the coupling ring. Inspection of the face of each connector will allow an approximate orientation of connectors prior to coupling, but indexing is strictly by feel upon engaging connectors, since the key and keyway are obscured. Obscure O-ring seal glands often result in failure of the coupling as a result of the seal glands not being properly in place or defective.

Threaded coupling arrangements are used extensively in mechanically coupled electrical connectors. The mechanical advantage as well as the relative unlimited travel make it a favorite in most applications over other types of couplings, such as lever or bayonet-type couplings. To perform as intended, it is necessary that the screw threads have proper maintenance such as protection, thread cleaning, and lubrication. The problems inherent with conventional threaded coupling arrangements are cross threading and thread galling. Cross threading may occur if the coupling members are not properly oriented and aligned when starting to engage the threads. Thread galling is the result of a contamination or burr being ground into the thread, creating a high stress or hot spot. This usually occurs on new parts being mated the first time. Conventional connectors are not necessarily sold as mated pairs and are therefore subject to being mated in the field for the first time. Additionally, a substantial reduction in efficiency and mechanical advantage results from resistance to thread make-up due to friction caused by corrosion, contamination, or improper lubrication. Conventional threaded couplers often are difficult to uncouple when the connectors have been made-up for an extended period of time in a hostile environment. Additionally, conventional connectors may suffer mashed, gouged, or bruised threads which may destroy the usefulness of the coupling connector.

It is desirable to have a mechanical coupling providing the advantages of a threaded connection without the problems associated with the maintenance, protection, and lubrication of the threads. It is further desirable that the mechanical coupling have threads which are protected from damage and eliminate the possibility of cross threading and thread galling. Furthermore, the mechanical coupling should be adaptable for use in both fluid and electrical connections.

SUMMARY OF THE PRESENT INVENTION

The present invention is for a coupling mechanism having a receptacle assembly and a plug assembly. The plug assembly includes a latch body, coupling nut, inner body, and a first coupler connector. The latch body is secured to the coupling nut in such a manner as to permit the coupling nut to rotate relative to the latch body. The coupling nut threadably engages the inner body, making up the plug assembly. The inner body moves longitudinally as the coupling nut is rotated. The first coupler connector is connected to the inner body.

The receptacle assembly includes a receptacle shell and a second coupler connector. The receptacle shell is constructed to accept the latch body. The receptacle shell and latch body connection can be accomplished by a variety of latches or interlocking mechanisms. The latch body and the receptacle shell are securely engaged by rotating the coupling nut clockwise which causes the inner body of the plug assembly to translate forward thereby securely engaging the receptacle shell. The continued clockwise rotation of the coupling nut results in the completion of the coupling connection of the first coupler connector and the second coupler connector. The coupling connection of the first coupler connector and the second coupler connector is effectuated by a permanently threaded engagement of the coupler nut and the inner body which is within a sealed chamber. Rotation of the coupling nut counter-clockwise causes the inner body to retract or translate rearwardly to firstly disengage the coupling connection and secondly, disengage the receptacle shell from the inner body.

BRIEF DESCRIPTION OF THE DRAWINGS

The objects, advantages and features of the invention will become more apparent by reference to the drawings which are appended hereto and wherein like numerals indicate like parts and wherein illustrated embodiments of the invention are shown, in which:

FIG. 1 is a side elevational view of a plug assembly and a receptacle assembly of a mechanical fluid coupling according to a first embodiment of the present invention in the uncoupled condition, the plug assembly is shown in partial cross-section and the receptacle assembly is shown in cross-section;

FIG. 3 is perspective view of the receptacle assembly of the mechanical fluid coupling of FIG. 1;

FIG. 5 is a view taken along line 5—5 of FIG. 1;

FIG. 6 is a view taken along line 6—6 of FIG. 1;

FIG. 7 is a view taken along line 7—7 of FIG. 1;

FIG. 8a is a view similar to FIG. 1 of the plug and receptacle assemblies of a mechanical electrical coupling in the uncoupled condition;

FIG. 8b is a view similar to FIG. 4 of the plug and receptacle assemblies of the mechanical electrical coupling in the coupled condition;

FIG. 12 is a cross-sectional side elevational view of the receptacle and plug assemblies of the mechanical fluids coupling of FIG. 9 in the coupled condition;

FIG. 13 is a view taken along line 13—13 of FIG. 12;

FIG. 14 is a view taken along line 14—14 of FIG. 12; and

FIG. 15 is a view taken along line 15—15 of FIG. 10.

DETAILED DESCRIPTION OF THE INVENTION

Referring to FIG. 1, a first embodiment of a mechanical fluid coupling, designated generally as 100, is shown in an uncoupled condition. The mechanical fluid coupling 100 includes a receptacle assembly 20 and a plug assembly 40. Preferably, the primary components of the latch screw coupling are made out of materials resistant to corrosion such as stainless steel. One such stainless steel is NITRONIC 50. NITRONIC 50 is a registered trademark of Armco, Inc.

Figure 2:
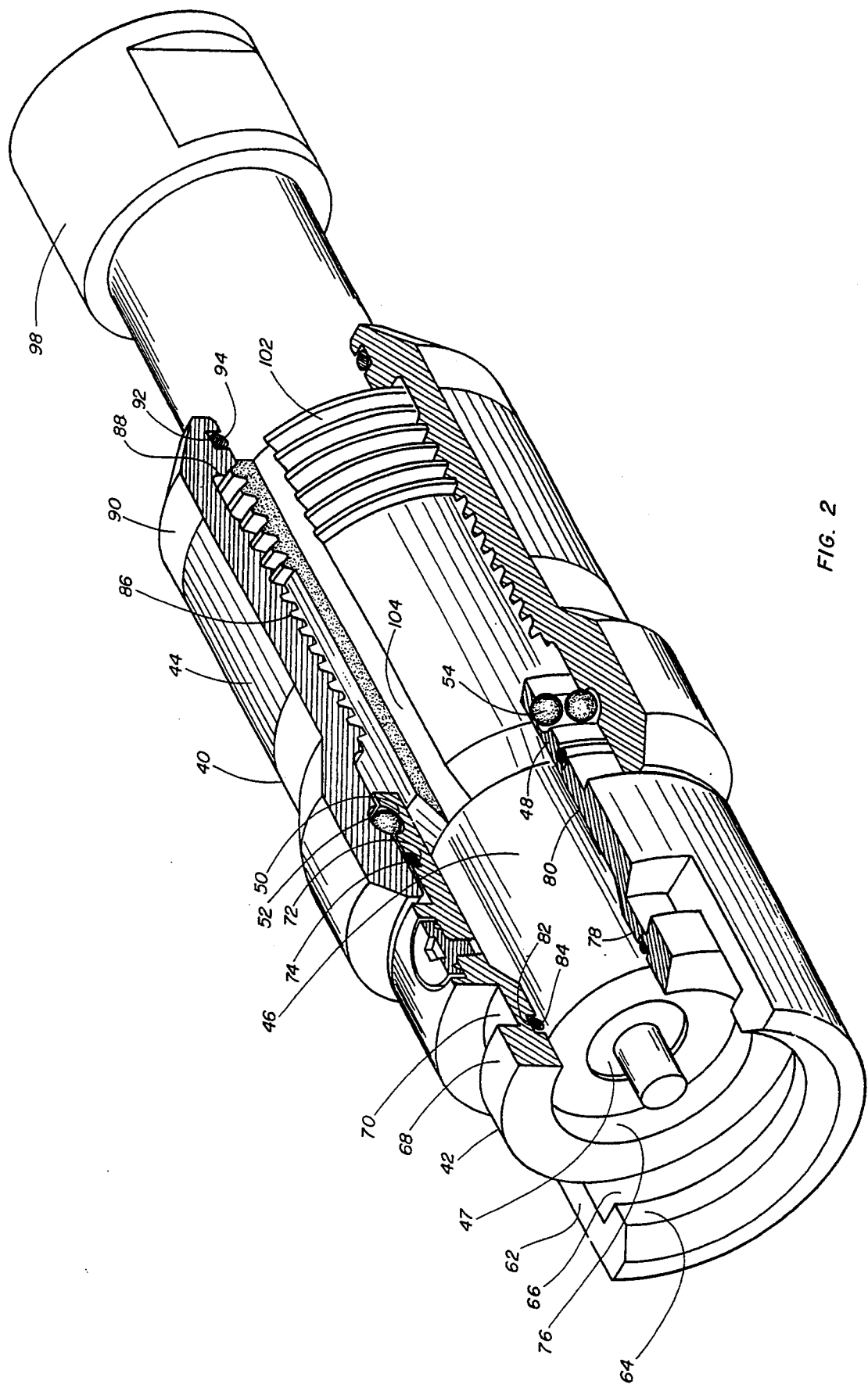
FIG. 2 is perspective view with a cutaway section of the plug assembly of the mechanical fluid coupling of FIG. 1.
Figure 4:
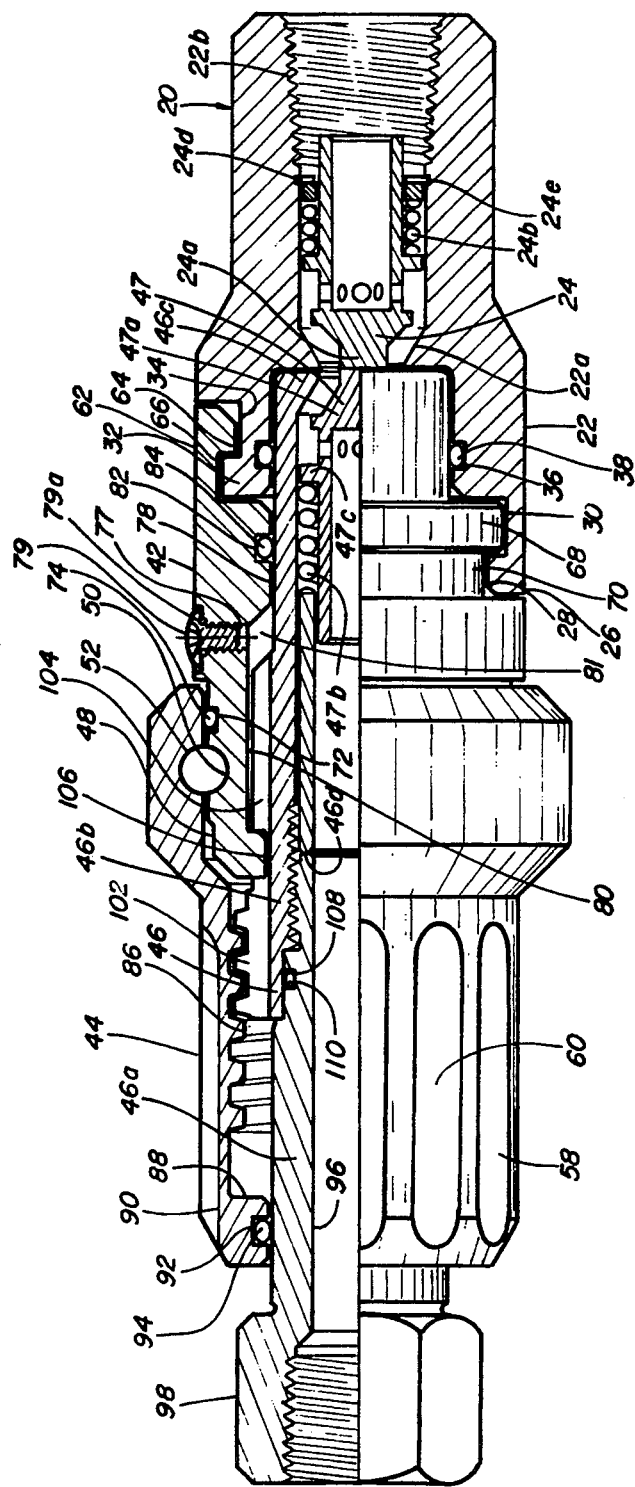
FIG. 4 is a partial sectional side elevational view of the plug and receptacle assemblies of the mechanical fluid coupling of FIG. 1 in the coupled condition.

Referring to FIGS. 1, 2, and 4, the plug assembly 40 includes a latch body 42, a coupling nut 44, an inner body 46, and a first coupling connector 47. A rear portion 48 of the latch body 42 is secured to the coupling nut 44 in such a manner as to permit the coupling nut 44 to rotate relative to the latch body 42. The rear portion 48 of the latch body 42 includes a external peripheral groove 50 which corresponds with an internal peripheral groove 52 in the coupling nut 44. As shown in FIGS. 2 and 5, a plurality of balls 54 are housed in the corresponding grooves 50 and 52 which maintain the coupling nut 44 in fixed axial relationship with the latch body 42. Referring to FIGS. 1 and 5, the coupling nut 44 includes a port 56 for inserting the plurality of balls 54 into the grooves 50 and 52. The port 56 is closed with a spring drive pin 57 which is driven in a drive pin slot 57a as shown in FIG. 1.

Referring to FIGS. 1, 2, and 4, the latch body 42 includes a peripheral groove 72 for receiving a seal 74, as for example an O-ring, to form a seal between the coupling nut 44 and the latch body 42. It is to be understood that other types of sealing members can also be used to form this seal.

Referring to FIGS. 1 and 4, the external rear portion of the coupling nut 44 includes a gripping area 58 comprising a plurality of longitudinal grooves 60 which provide a gripping surface to rotate the coupling nut 44 as will be described below. Several other types of gripping surfaces, such as a knurled surface, could also be used. FIG. 2 shows yet another type of gripping surface comprising a plurality of longitudinal lines inscribed in the outer surface of the coupling nut 44.

Referring to FIGS. 1, 2, and 4, the latch body 42 of the first embodiment includes a tongue-and-groove mating end 62. The mating end 62 includes an outer semicircular tongue 64, an outer semicircular groove 66, an inner circular tongue 68, and an inner circular groove 70.

Referring to FIGS. 1, 2, and 4, the latch body 42 has an internal bore 76 through which the inner body 46 is permitted to travel as will be explained below. The internal bore 76 has a first portion 78 of uniform diameter which steps to a second portion 80 having a larger uniform diameter. The first portion 78 includes a peripheral groove 82 for receiving a seal 84, as for example an O-ring, to form a seal between the latch body 42 and the inner body 46.

Referring to FIGS. 1, 4, and 6, the latch body 42 includes a threaded filler port 77 for receiving a filler screw 79. The filler screw 79 includes a seal member 79a for sealing the filler port 77 from the atmosphere. The filler port 77 is fluidly connected to a sealed chamber 81, as will be further described below.

The coupling nut 44 includes an internally threaded portion 86 which terminates near a rear end 90 of the coupling nut 44. A shoulder 88 located at the rear end 90 forms a stop to prevent the rearward removal of the inner body 46 from the coupling 100 and to prevent the disengagement of the threaded connection between the coupling nut 44 and the inner body 46. The rear end 90 includes an internal peripheral groove 92 for receiving a seal 94, as for example an O-ring, to form a seal between the coupling nut 44 and the inner body 46.

Referring to FIGS. 1 and 4, the inner body 46 is a tubular member having a throughbore 96. The inner body 46 includes a first inner body member 46a and a second inner body member 46b. The first inner body member 46a includes a conduit connector 98 which connects to the conduit or hose being coupled.

The inner body 46 has an externally threaded portion 102 which threadably engages the internally threaded portion 86 of the coupling nut 44. Referring to FIGS. 1, 2, 4, and 5, the inner body 46 includes a keyway 104 which receives and guides a key 106 formed at the inner end of the latch body 42. As shown in FIGS. 5 and 6, the inner body 46 includes a pair of keyways 104 and the latch body 42 includes a pair of keys 106. The keys 106 and the keyways 104 prevent rotation of the inner body 46 relative to the latch body 42.

Referring to FIGS. 1 and 4, the first inner body member 46a is threadably connected to the second inner body member 46b. The first inner body member 46a includes a peripheral groove 108 for receiving a seal 110, as for example an O-ring, to form a seal between the first and second inner body members 46a and 46b, respectively. The second inner body member 46b includes a forward lip 46c which forms a stop for the first coupling connector 47 which is inserted in the throughbore 96 of the second inner body member 46b. The first coupling connector 47 includes a plug 47a which is forwardly loaded by a compression spring 47b acting against a flange 47c of the plug 47a. The compression spring 47b is held in place with a sleeve 47d positioned between the spring 47b and an endface 46d of the first inner body member 46a.

Referring to FIG. 4, the sealed chamber 81 in the plug assembly 40 is formed between the interior of the coupling nut 44 and the latch body 42 and the exterior of the inner body 46. The chamber 81 is sealed by the plurality of seals 74, 79a, 84, 94, and 110 as described above. The sealed chamber 81 can be filled with a lubricant via the threaded filler port 77 to maintain the plug assembly 40 in optimum operating condition.

Referring to FIGS. 1, 3, and 4, the receptacle assembly 20 will now be described in detail. The receptacle assembly 20 includes a receptacle shell 22 and a second coupler connector 24. In the first embodiment, the receptacle shell 22 includes a tongue-and-groove mating end 26 to mate with the tongue-and-groove mating end 62 of the latch body 42. The mating end 26 includes an outer semicircular tongue 28, an outer semicircular groove 30, an inner circular tongue 32, and an inner circular groove 34.

Referring to FIGS. 1 and 4, the receptacle shell 22 includes an inner body passageway 35. The receptacle shell 22 includes an internal peripheral groove 36 for receiving a seal 38, as for example an O-ring, to form a seal between the receptacle shell 22 and the inner body 46 as shown in FIG. 4.

The receptacle shell 22 includes an interior lip 22a which forms a stop for the second coupling connector 24 which is inserted in a coupling passageway 35a of the receptacle shell 22. The second coupling connector 24 includes a plug 24a which is forwardly loaded by a compression spring 24b acting against a flange 24c of the plug 24a. The compression spring 24b is held in place with a lock ring 24d inserted in a lock ring groove 24e in the receptacle shell 22.

The receptacle shell 22 includes conduit connector 22b which threadably connects to the conduit or hose being coupled.

The operation of the first embodiment of the present invention will now be explained. The coupling nut 44 is rotated counter-clockwise such that the inner body 46 is in the rearward position as shown in FIG. 1. The plug assembly 40 and the receptacle assembly 20 are joined by transversely bringing the tongue-and-groove mating ends 62 and 26, respectively, together. The latch body 42 and the receptacle shell 22 are securely engaged by rotating the coupling nut 44 clockwise. The clockwise rotation of the coupling nut 44 causes the inner body 46 of the plug assembly 40 to translate forward. The latch body 42 and the receptacle shell 22 are securely engaged when the forward lip portion 46c enters into the inner body passageway 35 of the receptacle shell 22. The penetration of inner body 46 into the inner body passageway 35 prevents the transverse dislocation of the plug assembly 40 with the receptacle assembly 20.

The continued clockwise rotation of the coupling nut 44 results in the completion of the coupling connection of the first coupler connector 47 and the second coupler connector 24. The continued forward translation of the inner body 46 results in the plugs 47a and 24a coming into contact and compressing the compression springs 47b and 24b, respectively, which in turn permits fluid flow through the fluid coupling 100.

The coupling connection of the first coupler connector 47 and the second coupler connector 24 is effectuated by the permanently threaded engagement of the coupler nut 44 and the inner body 46 which is within a sealed chamber. Thus, there is no possibility of cross threading or thread galling while having the mechanical advantages of a threaded connection.

Rotation of the coupling nut 44 counter-clockwise causes the inner body 46 to retract or translate rearwardly to firstly disengage the coupling connection and secondly, disengage the receptacle shell 22 from the inner body 46.

Illustrated in FIGS. 8a and 8b is an electrical coupling, designated generally as 200, of the first embodiment of the present invention. The electrical coupling 200 is essentially the same as the fluid coupling 100 described above except for the following modifications.

It is to be understood that the same numeric and descriptive references will be used in describing components in the electrical coupling 200 which are identical to those components in the fluid coupling 100.

Referring to FIG. 8a, an inner body 246 includes a first inner body member 246a and a second inner body member 246b. The first inner body member 246a is connected to the second inner body member 246b. The first inner body member 246a is formed of molded rubber or neoprene which is bonded to the second inner body member 246b and the electrical cable to form a watertight seal and provide a mechanical stress relief for the cable.

The inner body 246 is a tubular member having a throughbore 296. The second inner body member 246b has an externally threaded portion 202 which threadably engages the internally threaded portion 86 of the coupling nut 44. The inner body 246 includes a keyway 204 which receives and guides a key 106 formed at the inner end of the latch body 42. The key 106 and the keyway 204 prevents rotation of the inner body 246 relative to the latch body 42.

Referring to FIG. 8a, an electrical socket connector insert 247 having socket contacts 247a is inserted in the throughbore 296 of the second inner body member 246b. The electrical socket connector insert 247 is typically a molded unit of glass reinforced epoxy. The electrical socket connector insert 247 is secured in place with a washer 247c and a retainer ring 247d. The washer 247c and the retainer ring 247d also serve to capture a seal 247e in an outer groove 247f of the socket connector insert 247. The seal 247e protects against fluid intrusion to the rear of the socket connector insert 247. Behind the socket connector insert 247 in the throughbore 296 of the second inner body member 246b, a potting compound 249 surrounds the electrical conduit and fills the throughbore 296. The potting compound 249 is well known in the art and has good dielectric strength and electrical insulation properties.

Similarly, the receptacle assembly 220 has an electrical pin connector insert 224 having pin contacts 224a. The pin connector insert 224 is inserted in the bore of the receptacle shell 222. The electrical pin connector insert 224 is secured in place with a washer 224b and a retainer ring 224c. The washer 224b and the retainer ring 224c also serve to capture a seal 224d in an outer groove 224e of the pin connector insert 224. Potting compound 225 is inserted behind the pin connector insert 224. The potting compound 225 surrounds the electrical conduit and fills the inner bore of the receptacle shell 222. The rearward end of the receptacle shell 222 is adapted to sealingly mate with a molded rubber or neoprene connector 227 attached to the electrical cable to form a watertight seal and provide a mechanical stress relief for the cable.

The clockwise rotation of the coupling nut 44 causes the inner body 246 to translate forward and securely engage the latch body 42 and the receptacle shell 22. The continued clockwise rotation of the coupling nut 44 results in the completion of the coupling connection of the electrical socket connector insert 247 and the electrical pin connector insert 224. Referring to FIG. 8b, the continued forward translation of the inner body 246 results in the socket contacts 247a of the electrical socket connector insert 247 sliding onto the pin contacts 224a of the electrical pin connector insert 224.

A second embodiment of the present invention is illustrated in FIGS. 9–15. The second embodiment is illustrated as a mechanical fluid coupling, designated generally as 300. The fluid coupling 300 includes many of the same features as shown and described in the first embodiment.

Figure 9:
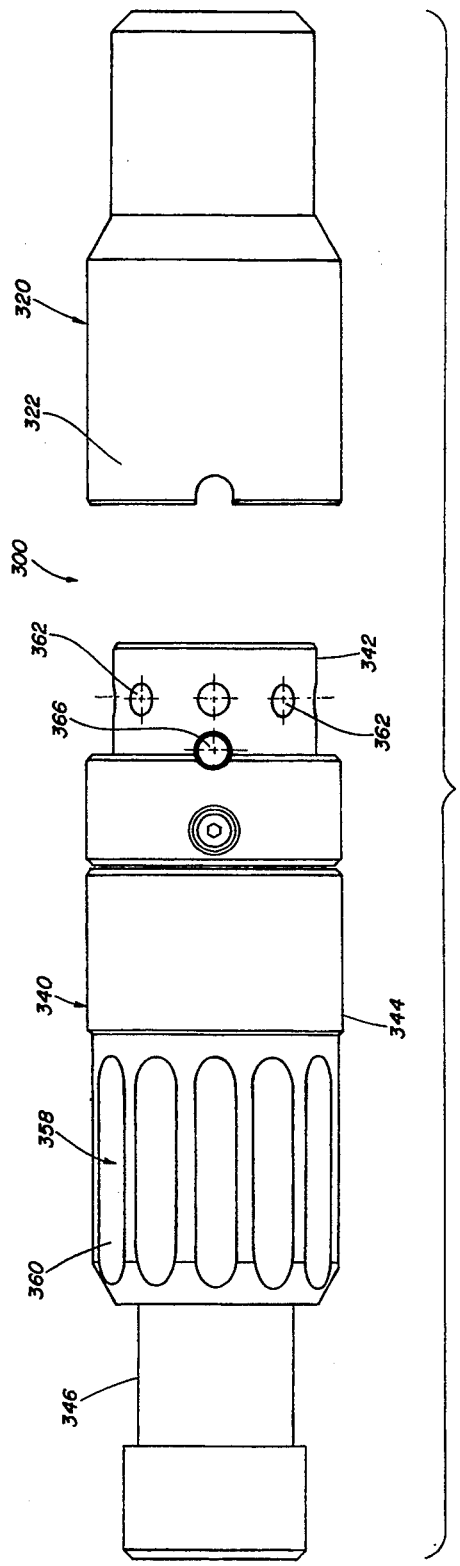
FIG. 9 is a top view of receptacle and plug assemblies of a mechanical fluid coupling according to a second embodiment of the present invention in the uncoupled condition.

Referring to FIG. 9, the second embodiment of the mechanical fluid coupling 300 is shown in an uncoupled condition. The mechanical fluid coupling 300 includes a receptacle assembly 320 and a plug assembly 340.

Figure 10:
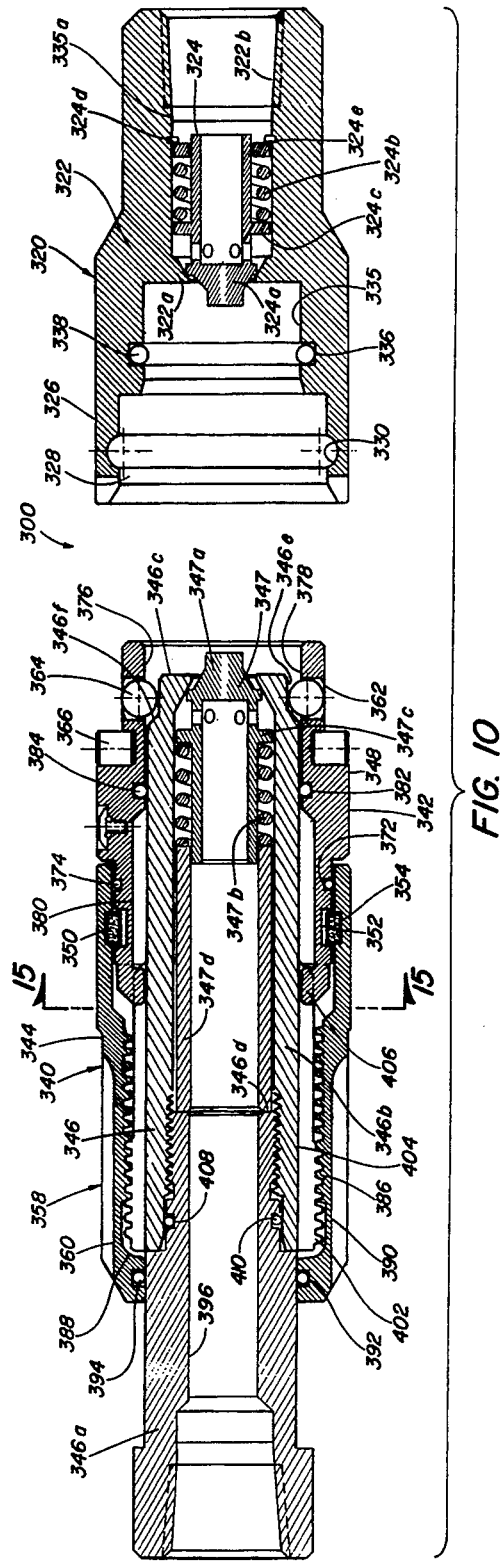
FIG. 10 is a cross-sectional side elevational view of the receptacle and plug assemblies of the mechanical fluid coupling of FIG. 9.
Figure 11:
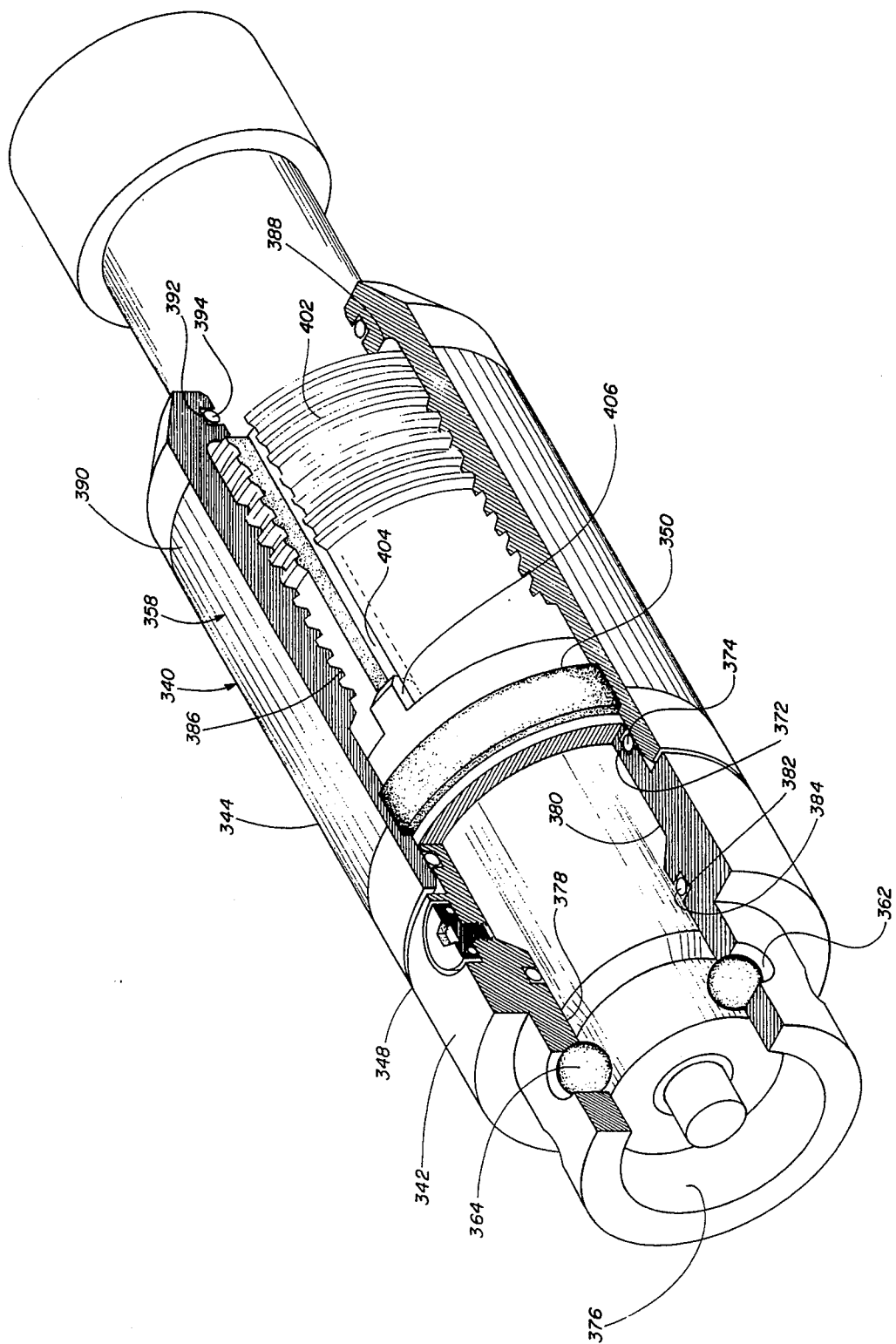
FIG. 11 is perspective view with a cutaway section of the plug assembly of the mechanical fluid coupling of FIG. 9.

Referring to FIGS. 9, 10, and 12, the plug assembly 340 includes a latch body 342, a coupling nut 344, an inner body 346, and a first coupling connector 347. A rear portion 348 of the latch body 342 is secured to the coupling nut 344 with a split collar 350 in such a manner as to permit the coupling nut 344 to rotate relative to the latch body 342. Referring to FIGS. 10, 11, and 12, the rear portion 348 of the latch body 342 includes a split collar groove 352 for receiving the split collar 350. The coupling nut 344 includes a companion split collar groove 354 in radial alignment with the latch body split collar groove 352 such that the split collar 350 maintains the axial relationship of the latch body 342 relative to the coupling nut 344.

Referring to FIGS. 10, 11, 12 and 13, the latch body 342 includes a peripheral groove 372 for receiving a seal 374, as for example an O-ring, to form a seal between the coupling nut 344 and the latch body 342. It is to be understood that other types of sealing members can also be used to form this seal.

Referring to FIGS. 9, 10, and 12, the external rear portion of the coupling nut 344 includes a gripping area 358 comprising a plurality of longitudinal grooves 360 which provide a gripping surface to rotate the coupling nut 344 as will be described below. Several other types of gripping surfaces, such as a knurled surface, could also be used. FIG. 11 shows yet another type of gripping surface comprising a plurality of longitudinal lines inscribed in the outer surface of the coupling nut 344.

Referring to FIGS. 9, 10, 11, 12, and 13, the latch body 342 includes a plurality of circumferentially spaced holes 362. As shown in FIG. 13, the holes 362 have a smaller diameter at the external periphery of the latch body 342 than at the internal periphery. A ball bearing 364 is positioned in each of the spaced holes 362. The ball bearings 364 have a diameter greater than the diameter of holes 362 at the external periphery in order to restrain the outward dislocation of the ball bearings 364 from the holes 362. It is to be understood that the ball bearings 364 could be restrained by other means, as for example by a lip located at the external periphery of the latch body 342. The latch body 342 further includes a plurality of alignment pins 366 for reasons which will be explained below.

Referring to FIGS. 10, 11, and 12, the latch body 342 has an internal bore 376 through which the inner body 346 is permitted to travel as will be explained below. The internal bore 376 has a first portion 378 of uniform diameter which steps to a second portion 380 having a larger uniform diameter. The first portion 378 includes a peripheral groove 382 for receiving a seal 384, as for example an O-ring, to form a seal between the latch body 342 and the inner body 346.

The coupling nut 344 includes an internally threaded portion 386 which terminates near a rear end 390 of the coupling nut 344. A shoulder 388 located at the rear end 390 forms a stop to prevent the rearward removal of the inner body 346 from the coupling 300 and to prevent the disengagement of the threaded connection between the coupling nut 344 and the inner body 346. The rear end 390 includes an internal peripheral groove 392 for receiving a seal 394, as for example an O-ring, to form a seal between the coupling nut 344 and the inner body 346.

Referring to FIGS. 10 and 12, the inner body 346 is a tubular member having a throughbore 396. The inner body 346 includes a first inner body member 346a and a second inner body member 346b. The first inner body member 346a includes a conduit connector 398 which connects to the conduit or hose being coupled.

The inner body 346 has an externally threaded portion 402 which threadably engages the internally threaded portion 386 of the coupling nut 344. Referring to FIGS. 10, 11, 12, 14 and 15, the inner body 346 includes a keyway 404 which receives and guides a key 406 formed at the inner end of the latch body 342. As shown in FIGS. 10, 12, 14, and 15, the inner body 346 includes a pair of keyways 404 and the latch body 342 includes a pair of keys 406. The keys 406 and the keyways 404 prevent rotation of the inner body 346 relative to the latch body 342.

Referring to FIGS. 10 and 12, the first inner body member 346a is threadably connected to the second inner body member 346b. The first inner body member 346a includes a peripheral groove 408 for receiving a seal 410, as for example an O-ring, to form a seal between the first and second inner body members 346a and 346b, respectively. The second inner body member 346b includes a forward lip 346c which forms a stop for the first coupling connector 347 which is inserted in the throughbore 396 of the second inner body member 346b. The first coupling connector 347 includes a plug 347a which is forwardly loaded by a compression spring 347b acting against a flange 347c of the plug 347a. The compression spring 347b is held in place with a sleeve 347d positioned between the spring 347b and an endface 346d of the first inner body member 346a. The second inner body member 346b includes a forward end 346e having a stepped diameter 346f for reasons which will be explained below.

Referring to FIGS. 9, 10 and 12, the receptacle assembly 320 will now be described in detail. The receptacle assembly 320 includes a receptacle shell 322 and a second coupler connector 324. In the second embodiment, the receptacle shell 322 includes a socket end 326 to mate with the forward end of the latch body 342. The socket end 326 includes a shell opening 328 and a peripheral groove 330 which aligns with the plurality of spaced holes 362 in the latch body 342. The socket end 326 also includes a plurality of alignment openings 332 for receiving the alignment pins 366.

Referring to FIGS. 10 and 12, the receptacle shell 322 includes an inner body passageway 335. The receptacle shell 322 includes an internal peripheral groove 336 for receiving a seal 338, as for example an O-ring, to form a seal between the receptacle shell 322 and the inner body 346 as shown in FIG. 12.

The receptacle shell 322 includes an interior lip 322a which forms a stop for the second coupling connector 324 which is inserted in a coupling passageway 335a of the receptacle shell 322. The second coupling connector 324 includes a plug 324a which is forwardly loaded by a compression spring 324b acting against a flange 324c of the plug 324a. The compression spring 324b is held in place with a lock ring 324d inserted in a lock ring groove 324e in the receptacle shell 322.

The receptacle shell 322 includes conduit connector 322b which threadably connects to the conduit or hose being coupled.

The operation of the second embodiment of the present invention will now be explained. The coupling nut 344 is rotated counter-clockwise such that the inner body 346 is in the rearward position as shown in FIGS. 9, 10, and 11. The plug assembly 340 and the receptacle assembly 320 are joined by axially bringing the latch body 342 and the socket end 326, respectively, together. The latch body 342 and the receptacle shell 322 are securely engaged by rotating the coupling nut 344 clockwise. The clockwise rotation of the coupling nut 344 causes the inner body 346 of the plug assembly 340 to translate forward. The latch body 342 and the receptacle shell 322 are securely engaged when the stepped diameter 346f of the inner body 346 is forwardly translated which in turn outwardly forces the ball bearings 364 to seat in the peripheral groove 330 of the socket end 326. The seating of the ball bearings 364 in the peripheral groove 330 prevents the axial dislocation of the plug assembly 340 with the receptacle assembly 320.

The continued clockwise rotation of the coupling nut 344 results in the completion of the coupling connection of the plug coupler connector 347 and the second coupler connector 324. The continued forward translation of the inner body 346 results in the plugs 347a and 324a coming into contact and compressing the compression springs 347b and 324b, respectively, which in turn permits fluid flow through the fluid coupling 300.

As in the first embodiment, the coupling connection of the first coupler connector 347 and the second coupler connector 324 is effectuated by the permanently threaded engagement of the coupler nut 344 and the inner body 346 which is within a sealed chamber. Thus, there is no possibility of cross threading or thread galling while having the mechanical advantages of a threaded connection.

Rotation of the coupling nut 344 counter-clockwise causes the inner body 346 to retract or translate rearwardly to firstly disengage the coupling connection and secondly, disengage the receptacle shell 322 from the inner body 346.

It is to be understood that the receptacle shell and latch body connection of the latch screw coupling of the present invention can be accomplished by a variety of latches or interlocking mechanisms typical in the industry. It is also to be understood that the relative motion created or imparted by the threaded engagement of the coupler nut and the inner body can also be accomplished by other means such as a cam and cam follower.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. A mechanical coupling comprising:
   a first assembly, said first assembly comprising:
      first means for latching;
      a coupling nut having an interior threaded portion;
      an inner body having an exterior threaded portion in constant threaded engagement with said interior threaded portion; and
      means for sealing said interengaging threaded portions of said coupling nut and said inner body to form a sealed chamber enclosing said threaded portions; and
   a second assembly adapted to engage said first assembly, said second assembly comprising:
      second means for latching.

2. The mechanical coupling of claim 1, further comprising means for securing said first means for latching to said second means for latching.

3. The mechanical coupling of claim 2, wherein said first means for latching comprises a first latching body having a first bore and said second means for latching comprises a second latching body having a second bore and said means for securing comprises a shaft portion which is capable of protruding beyond said first bore and into said second bore.

4. The mechanical coupling of claim 3, wherein said first and second latching bodies include reciprocal mating tongue-and-groove half-portions.

5. The mechanical coupling of claim 1, wherein said means for sealing comprises:
   first seal means located between said coupling nut and said inner body and forming a seal therebetween;
   second seal means located between said coupling nut and said first means for latching and forming a seal therebetween; and third seal means located between said first means for latching and said inner body and forming a seal therebetween, wherein said first, second and third seal means form a sealed chamber enclosing said threaded portions of said coupling nut and said inner body.

6. The mechanical coupling of claim 1, wherein said first means for latching includes a first bore adapted to receive said inner body and allow said inner body to translate relative to said first means for latching.

7. The mechanical coupling of claim 1, further comprising means for rotatably connecting said coupling nut to said first means for latching such that said coupling nut is adapted to rotate relative to said first means for latching and said inner body.

8. The mechanical coupling of claim 1, further comprising means for fixing said inner body from rotating relative to said first means for latching.

9. A mechanical coupling comprising:
a first assembly, said first assembly comprising:
 a coupling nut having a threaded portion;
 a first latching body connected to said coupling nut such that said coupling nut is capable of rotating relative to said first latching body;
 an inner body having a threaded portion threadably engaging said coupling nut; and
 first means for coupling connected to said inner body; and
a second assembly adapted to engage said first assembly, said second assembly comprising:
 second means for latching; and
 second means for coupling.

10. The mechanical coupling of claim 9, wherein said second means for latching comprises a second latching body capable of interconnecting with said first latching body.

11. The mechanical coupling of claim 10, wherein said second means for coupling is secured to said second latching body and said first and second coupling means are capable of matingly connecting with each other.

12. The mechanical coupling of claim 10, wherein said first latching body includes a male end having a plurality of circumferentially spaced holes and a ball seated in each of said spaced holes;
said second latching body includes a female end having an interior circumferential groove;
said inner body having a stepped diameter end portion;
wherein said first and second latching bodies are capable of being securely interconnected by the stepped diameter end portion of said inner body forcing said balls to partially seat in the circumferential groove of said second latching body and the holes of said first latching body.

13. The mechanical coupling of claim 9, further comprising means for securing said first latching body to said second means for latching.

14. The mechanical coupling of claim 13, wherein said first latching body includes a first bore and said second means for latching comprises a second latching body having a second bore and said means for securing comprises a shaft portion which is capable of protruding from said first bore and into said second bore.

15. The mechanical coupling of claim 14, wherein said first and second latching bodies include reciprocal mating tongue-and-groove half-portions.

16. The mechanical coupling of claim 9, further comprising means for sealing said threaded portions of said coupling nut and said inner body to form a sealed chamber enclosing said threaded portions.

17. The mechanical coupling of claim 16, wherein said means for sealing comprises:
first seal means located between said coupling nut and said inner body and forming a seal therebetween;
second seal means located between said coupling nut and said first latching body and forming a seal therebetween; and
third seal means located between said first latching body and said inner body and forming a seal therebetween,
wherein said first, second and third seal means form a sealed chamber enclosing said threaded portions of said coupling nut and said inner body.

18. A mechanical coupling comprising:
a first assembly, said first assembly comprising:
 a first latching body having a first bore;
 a coupling nut;
 an inner body threadably engaging said coupling nut; and
 first means for coupling connected to said inner body;
a second assembly adapted to engage said first assembly, said second assembly comprising:
 a second latching body having a second bore; and
 second means for coupling; and
said first assembly further including means for securing said first assembly to said second assembly, said means for securing comprising a shaft portion in said first bore which is capable of translating into said second bore.

19. The mechanical coupling of claim 18, further comprising:
means for rotatably connecting said coupling nut to said first latching body such that said coupling nut is adapted to rotate relative to said first latching body;
means for fixing said inner body from rotating relative to said first latching body; and
said shaft portion is connected to said inner body and said shaft portion translates from said first bore into said second bore independently of any movement of said first latching body by rotating said coupling nut relative to said inner body.

* * * * *